United States Patent [19]

Takenaka et al.

[11] Patent Number: 5,056,799

[45] Date of Patent: Oct. 15, 1991

[54] LIP SEAL DEVICE

[75] Inventors: Akira Takenaka; Keiichi Shimasaki; Hiroshi Kanayama, all of Toyota, Japan

[73] Assignee: Taiho Kogyo Co., Ltd., Toyota, Japan

[21] Appl. No.: 484,293

[22] Filed: Feb. 26, 1990

[30] Foreign Application Priority Data

Feb. 28, 1989 [JP] Japan .................................. 1-48328

[51] Int. Cl.$^5$ .............................................. F16K 41/08
[52] U.S. Cl. ........................................ 277/47; 277/152; 277/205; 277/208; 277/214; 277/215
[58] Field of Search ................. 277/47, 134, 152, 153, 277/180, 38, 205, 208, 214, 215

[56] References Cited

U.S. PATENT DOCUMENTS

| 2,329,028 | 9/1943 | Austin | 277/152 |
|---|---|---|---|
| 3,195,906 | 7/1965 | Moyers | 277/211 X |
| 3,647,229 | 3/1972 | Grimes | 277/207 |
| 3,831,950 | 8/1974 | Bentley et al. | 277/75 |
| 3,857,156 | 12/1974 | Clark | 29/417 |
| 3,929,341 | 12/1975 | Clark | 277/134 |
| 4,131,285 | 12/1978 | Denton et al. | 277/152 X |
| 4,449,717 | 5/1984 | Kitawaki et al. | 277/152 X |
| 4,568,092 | 2/1986 | Hayashida et al. | 277/152 |
| 4,695,063 | 9/1987 | Schmitt et al. | 277/152 X |
| 4,721,314 | 1/1988 | Kanayama et al. | 277/152 |
| 4,822,059 | 4/1989 | Shimasaki et al. | 277/134 X |
| 4,834,397 | 5/1989 | Shimasaki et al. | 277/152 |
| 4,848,776 | 7/1989 | Winckler | 277/153 X |
| 4,886,281 | 12/1989 | Ehrmann et al. | 277/47 |
| 4,903,971 | 2/1990 | Bauer | 277/152 |

FOREIGN PATENT DOCUMENTS 57-126635 8/1982 Japan .
2173264 10/1986 United Kingdom ................ 277/152

Primary Examiner—William A. Cuchlinski, Jr.
Assistant Examiner—James K. Folker
Attorney, Agent, or Firm—Sughrue, Mion, Zinn, Macpeak and Seas

[57] ABSTRACT

A lip seal device for sealing the gap between a housing and a rotary shaft comprises a case surrounding the rotary shaft, and a lip seal located on the case and curved toward a sealed fluid and having a sealing surface in sliding contact with an outer circumferential surfaces of the rotary shaft. The lip seal device includes a seal member on the seal surface for sealing a gap between the seal surface and the rotary shaft. The seal member includes a primary annular groove and an auxiliary seal means. The primary annular groove extends continuously in the circumferential direction of the rotary shaft. The auxiliary seal means, either projections or grooves are provided adjacent to the primary annular groove.

4 Claims, 2 Drawing Sheets

LIP SEAL DEVICE

BACKGROUND OF THE INVENTION

The present invention relates to a lip seal device having a lip seal in sliding contact with a rotary shaft.

A lip seal device having a case which surrounds a rotatably supported shaft and a lip seal whose inner circumferential portions are curved toward a sealed fluid and come into sliding contact with an outer circumferential surface of the rotary shaft is well known. Also as shown in Japanese Patent Unexamined Publication No.126635/1982, the lip seal device of the same type having a spiral groove formed on a seal surface between the lip seal and the rotary shaft is well known.

However, in the conventional lip seal device, there would be an undue amount of leakage of the sealed fluid because of the weakness of contact force between the lip seal and the rotary shaft particularly in the initial installed stage.

The above-mentioned lip seal device having the spiral groove arrangement is apparently inferior in sealing function to the normal lip seal device, especially when the rotary shaft is stopped.

SUMMARY OF THE INVENTION

An object of the present invention is to eliminate the above-mentioned drawbacks.

According to the present invention, there is provided a lip seal device in which an annular groove extending in a circumferential direction of a rotary shaft is provided with a seal surface between a lip seal and the rotary shaft, and annular projections each projecting toward the rotary shaft are formed adjacent to the annular groove.

According to another aspect of the present invention, instead of the above-described annular projections, the second annular grooves each of which has a width smaller than that of the first annular groove are formed adjacent to the first annular groove.

With respect to the first embodiment, since a thickness of the lip seal in which the annular groove is formed is thinner than the other portion of the lip seal. Therefore the portion of the lip seal in which the annular groove is formed is pressed to readily deform by a pressure of the sealed fluid. As a result, both side portions of the annular groove are specially and strongly pressed to contact with the outer circumferential surface of the rotary shaft. The annular groove continuously extends in the circumferential direction of the rotary shaft, so the contact portion is also formed continuously in the circumferential direction. Further, in this arrangement, since two annular contact portions are provided adjacent to the annular groove, a so-called double sealed function is obtained. Therefore, it is possible to obtain a sufficient sealing function not only in the state where the rotary shaft rotates but also where it stops.

In addition, since the annular projections each projecting toward the rotary shaft are formed adjacent to the annular groove, the pressure of the annular contacted portions can be fully increased to seal the gap between the lip seal and the rotary shaft. Therefore, as compared with the case of providing no annular projections, the leakage of the sealed fluid due to an insufficient contact force between the lip and the rotary shaft can be effectively prevented by the abovementioned arrangement particularly in the initial operation stage immediately after the installation.

With respect to the second aspect of the invention, since the two annular contact portions are provided adjacent to the first annular groove, a double sealing function can be obtained in the same manner. In the second embodiment, since the second annular grooves each of which a width is smaller than that of the first annular groove are formed adjacent to the first annular groove, the seal area defined between the lip seal and rotary shaft is prevented from being unduly small and from causing an adverse affect against the durability. Therefore, as compared with the case of providing no second annular groove, the leakage of the sealed fluid due to an insufficient contact force between the lip and the rotary shaft can be effectively prevented by the above-mentioned function in the initial operation stage immediately after the installation.

DETAILED DESCRIPTION OF THE PREFERRED EMBODIMENT

The invention will now be described with reference to the accompanying drawings.

Figure 1:
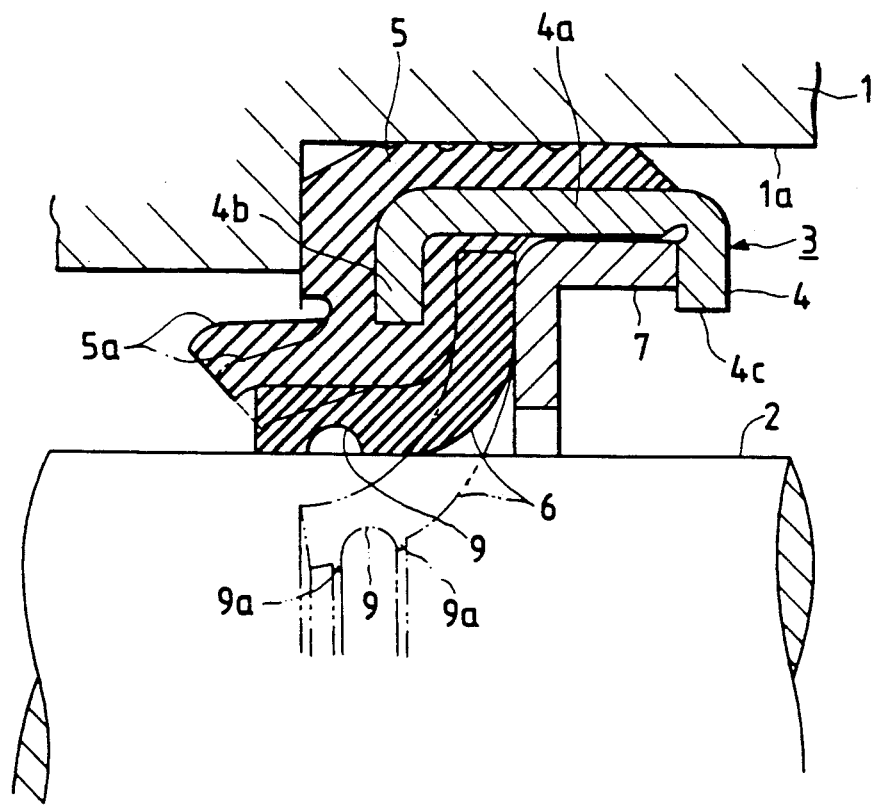
FIG. 1 is a sectional view showing a lip seal device according to an embodiment of the present invention.

FIG. 1 shows a lip seal device 3 according to an embodiment of the invention. A rotary shaft 2 is adapted to extend through a housing 1. The seal device is supported to a stepped hole la formed in the housing 1. The lip seal device 3 seals a gap between an inner circumferential surface of stepped hole la and an outer circumferential surface of the rotary shaft 2. This lip seal device 3 is comprised of four members, that is, a metal case 4, a seal member 5 made of a rubber or a synthetic resin, a lip 6 made of a rubber or a synthetic resin and a metal spacer 7.

The metal case 4 is formed in a cylindrical shape so as to surround the rotary shaft 2. The case 4 has a U-shape in cross-section that includes a cylindrical portion 4a extending in the axial direction and flange portions 4b and 4c extending in the radially inward direction from edge portions of the cylindrical portion 4a, respectively.

With respect to the case 4 which is not provided with the lip 6 or the spacer 7 in an assembling stage, one flange portion 4c extends in the axial direction of the cylindrical portion 4a. After the lip 6 and spacer 7 have been provided in the assembly, the flange portion 4c is bent in the radially inward direction so that the metal case 4 is formed to be a U-shape in cross section.

The seal member 5 is attached to be united with the case 4 by vulcanizing, joining or adhesives. The seal member 5 continuously covers the outer circumferential portion of the cylindrical portion 4a, outer and inner portions of flange portion 4b and the inner cylindrical portion of the cylindrical portion 4a.

In an axially inward end portion of the seal member 5 on the flange 4b side, there is formed an auxiliary lip portion 5a which extends obliquely forwardly from the end portion toward the rotary shaft 2 under a free condition before the lip end 5a comes into contact with the surface of the outer end portion of lip 6 as indicated by a phantom line in FIG. 1. The auxiliary lip portion 5a is biased in a direction in which an inner circumferential portion of the lip 6 is brought into contact with the rotary shaft 2 under the assembled condition.

The radially outward circumferential portion of the lip seal 6 is attached to such a part of the seal member 5 that covers an inside portion of the flange portion 4b and an inward circumferential portion of the cylindrical portion 4a. In addition, a spacer 7 is liquid-tightly provided between the outward circumferential portion of the lip 6 and the flange portion 4c. Therefore, the lip 6, the seal member 5, the metal case 4 and the spacer 7 are coupled together in unison.

Further, the inward circumferential portion of the lip 6 is curved toward the sealed fluid so as to project leftwardly. An inward circumferential surface of the projecting portion of the lip seal 6 comes in elastic contact with the outer circumferential surface of the rotary shaft 2 by elastic forces of the lip 6 and the supporting lip member 5a. With such an arrangement, the sealed fluid existing on the left side of the lip 6 is prevented from leaking to the right space of the lip 6 which is exposed in the atmosphere.

An annular groove 9 is continuously provided in the circumferential direction on the seal surface formed between the lip 6 and the rotary shaft 2. In addition, annular projections 9a each of which projects toward the rotary shaft 2 are formed adjacent and along the annular groove 9.

In the above-mentioned arrangement, since the annular groove 9 is formed on the seal surface of the lip 6, the thickness of the lip seal 6 is decreased on the portion of the lip seal 6 in which the annular groove 9 is formed. Therefore, when the pressure of sealed fluid is applied to the seal surface, the seal surface in which the annular groove 9 is formed is easily deformed. As a result, the annular projections 9a which are formed on both the sides of the annular groove 9 are, respectively, strongly pressed to contact on the outer circumferential surface of the rotary shaft 2 so that annular projections 9a come to continuous linear contact with the rotary shaft 2 in the circumferential direction. Therefore, since two annular contact portions are formed adjacent to the annular groove, a so-called double sealing function is obtained by forming the annular projections 9a adjacent to the annular groove 9.

In the case of providing the annular projections 9a, it is possible to apply a pressure higher than that of the case where no annular projections are provided to the contact portions. Therefore, the leakage of the sealed fluid due to insufficient contact force between the lip 6 and the rotary shaft 2 can be effectively prevented by the above-mentioned high pressure contact therebetween in the initial operation stage immediately after the installation.

The sufficient surface of the lip 6 is quickly formed by the auxiliary seal means 9a which is provided adjacent to the primary groove 9. When the annular projections 9a are formed to be continuous directly with the edges of the first annular groove, an excellent sealing pressure distribution for the seal surface can be obtained. As a result, the excellent sealing function can be maintained for a long period of time by the above-mentioned projections 9a. The height of the annular projections (i.e., the length from the seal surface to the end of the projection) 9a should fall within such a range that an effective seal surface can be formed in cooperation with the surface of the rotary shaft 2.

Figure 2:
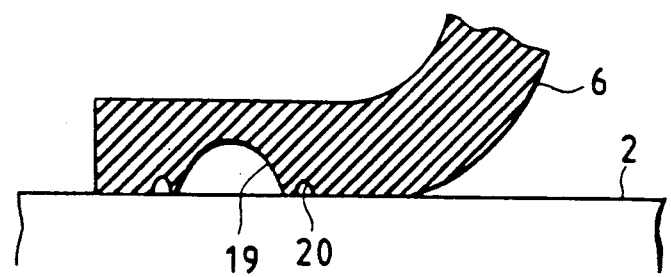
FIG. 2 is a sectional view showing a primary part of the lip seal device according to the second embodiment of the present invention.

FIG. 2 shows the second embodiment of the present invention which is provided with second annular grooves 20 each of which has a width smaller than that of the first annular groove and each second annular groove is formed adjacent and along the first annular groove 19. The other parts of this embodiment are arranged in the same manner as in the first embodiment.

According to this embodiment, since at least two annular contact portions are formed on both sides of the first annular groove 19, a double seal function is obtained. In addition, since each of the second annular grooves 20 is a thin annular groove, it is possible to increase the pressure against the annular contact portion between the first annular groove 19 and the second annular grooves 20. In this arrangement, the seal area defined between the lip seal 6 and the rotary shaft 2 is sufficiently large to promote durability. Therefore, as compared with the case of providing no second annular groove 20, the leakage of the sealed fluid due to an insufficient contact force between the lip 6 and the rotary shaft 2 can be effectively prevented in the initial operation stage immediately after the installation.

It is desired that a depth of each second annular groove 20 is smaller than that of the first annular groove 19. If the depth of the second annular grooves 20 is smaller than that of the first annular groove 19, a more effective sealing function can be obtained. A preferable axial position of each second annular groove 20 is as follows. With respect to an axial width of the seal surface which is formed on each side of the first annular groove 19, it is desired that the second annular grooves 20 be located on a center portion of the axial width closer to the first annular groove 19. With respect to the sealing function, it is desired that the second annular grooves 20 be provided as close to the first annular groove 19 as possible.

Figure 4:
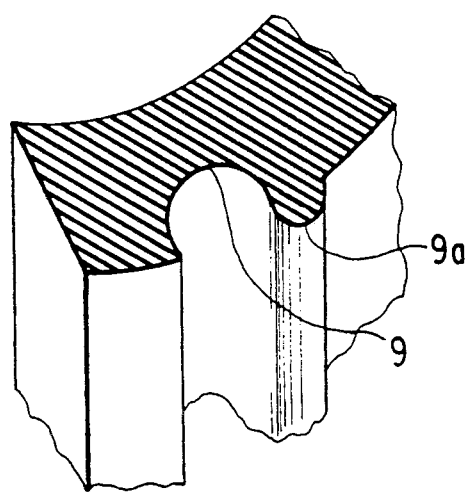
FIG. 4 is a partial perspective view showing a modification to the lip seal embodiment of FIG. 1.

Although the annular projections 9a or the second annular grooves 20 are formed on both sides of the annular groove 9 or 19 in the above-mentioned embodiments, annular projections 9a or second annular grooves 20 may be formed only on one side of the annular groove 9 or 19, as shown in FIG. 4. In this case, the tip portion of the lip seal 6 is not sufficiently sealed to the outer circumferential surface of the rotary shaft 2.

Figure 3:
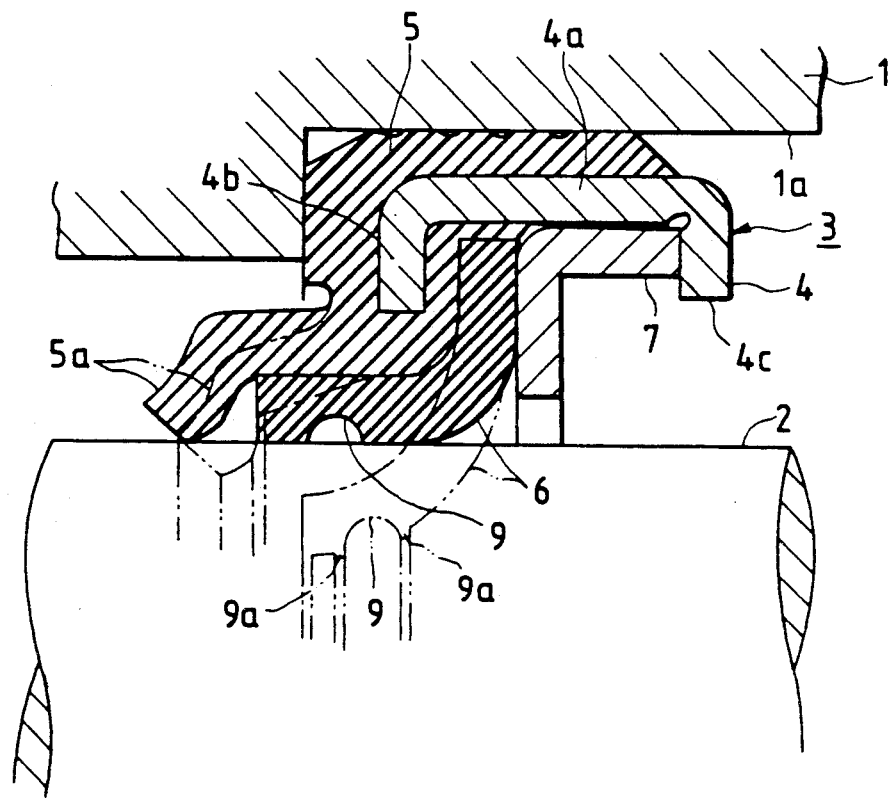
FIG. 3 is a sectional view showing a lip seal device according to the third embodiment of the present invention.

FIG. 3 shows the third embodiment of the present invention. In an axially inward end portion of the lip seal member 5 on the flange 4b side, there is formed an auxiliary lip portion 5a which extends obliquely forwardly from the end portion toward the rotary shaft 2 under a free condition before the lip end 5a comes into contact with the rotary shaft 2 as indicated by a phantom line in FIG. 3. The auxiliary lip portion 5a is biased in a direction in which an inner circumferential portion of the lip portion 5a is brought into contact with the rotary shaft 2 under the assembled condition. In other words, the inner circumferential tip end portion of the lip portion 5a may be in sliding contact with the rotary shaft 2 so as to obtain an effective seal in the abovementioned contact portion.

As described above, according to the present invention, the annular groove 9 or 19 is provided in the lip seal 6 so that two annular contact portions are formed adjacent to the annular groove 9 or 19. Further, in the present invention, the pressure of the annular contact portions can be increased by providing annular projections 9a or second annular grooves 20 adjacent annular groove 9 or 19. Therefore, a sufficient sealing function is obtained not only in the state where the rotary shaft rotates but also where it stops, and the leakage of the sealed fluid due to an insufficient contact force between the lip 6 and the rotary shaft 2 can be effectively prevented by the above-mentioned arrangements, when this device is assembled.

What is claimed is:

1. A lip seal device for sealing the gap between a housing and a rotary shaft, comprising:
   a case adapted to surround said rotary shaft;
   a lip seal located on said case, said lip seal being curved toward a sealed fluid, said lip seal having a seal surface in sliding contact with the outer circumferential surface of said rotary shaft; and
   seal means on said seal surface for sealing a gap between said seal surface and said rotary shaft, said seal means including a primary annular groove and an auxiliary seal means, said primary annular groove extending continuously in the circumferential direction of said rotary shaft, and having an axial width significantly greater than the axial width of the auxiliary seal means, said auxiliary seal means being provided adjacent to said primary annular groove said groove being recessed into said seal surface, wherein said auxiliary seal means comprises at least one annular projection, said annular projection being provided adjacent to said primary annular groove and projecting from said sealing surface toward said rotary shaft.

2. The lip seal device according to claim 1, wherein said auxiliary seal means comprises two annular projections, said annular projections being provided adjacent and along both sides of said primary annular groove.

3. The lip seal device according to claim 1, wherein said auxiliary seal means comprises a single annular projection, said annular projection being provided only on one side of said primary annular groove.

4. A lip seal device for sealing the gap between a housing and a rotary shaft, comprising:
   a case adapted to surround said rotary shaft;
   a lip seal located on said case, said lip seal being curved toward a sealed fluid, said lip seal having a seal surface in sliding contact with the outer circumferential surface of said rotary shaft; and
   seal means on said seal surface for sealing a gap between said seal surface and said rotary shaft, said seal means including a primary annular groove and an auxiliary steel means, said primary annular groove extending continuously in the circumferential direction of said rotary shaft being recessed into said seal surface, and having an axial width and radial length significantly greater than the axial width and radial length of the auxiliary seal means, said auxiliary seal means being provided adjacent to said primary annular groove, wherein said auxiliary seal means comprises two auxiliary annular grooves recessed into said seal surface, said auxiliary annular grooves each being provided adjacent and along a respective side of said primary annular groove.

* * * * *